United States Patent
Taveau et al.

(10) Patent No.: US 12,022,290 B2
(45) Date of Patent: *Jun. 25, 2024

(54) SECURE ELEMENTS BROKER (SEB) FOR APPLICATION COMMUNICATION CHANNEL SELECTOR OPTIMIZATION

(71) Applicant: PAYPAL, INC., San Jose, CA (US)

(72) Inventors: Sebastien Taveau, Redwood City, CA (US); John Hastings Granbery, Boston, MA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,457

(22) Filed: Feb. 24, 2023

(65) Prior Publication Data
US 2023/0284021 A1 Sep. 7, 2023

Related U.S. Application Data

(63) Continuation of application No. 17/140,872, filed on Jan. 4, 2021, now Pat. No. 11,595,820, which is a
(Continued)

(51) Int. Cl.
*H04W 12/08* (2021.01)
*G06F 21/60* (2013.01)
(Continued)

(52) U.S. Cl.
CPC .......... *H04W 12/08* (2013.01); *G06F 21/606* (2013.01); *G06Q 20/3223* (2013.01);
(Continued)

(58) Field of Classification Search
CPC ......... H04W 12/08; H04W 4/60; H04W 4/80; G06F 21/606; G06Q 20/3223;
(Continued)

(56) References Cited

U.S. PATENT DOCUMENTS 4,408,306 A 10/1983 Kuo
4,527,256 A 7/1985 Giebel
(Continued)

FOREIGN PATENT DOCUMENTS

CN 1479533 A 3/2004
CN 1908981 A 2/2007
(Continued)

OTHER PUBLICATIONS

Abstract of CN1908981A, Fujitsu Ltd, Feb. 7, 2007, 51 pages.
(Continued)

*Primary Examiner* — El Hadji M Sall
(74) *Attorney, Agent, or Firm* — Haynes and Boone, LLP

(57) ABSTRACT

Systems and methods for managing concurrent secure elements on a mobile device to coordinate with an application or "app" running on the mobile device and an appropriate communications protocol for conducting transactions using the mobile device include: informing, by the processor, the reader device of a preferred app and a communication protocol usable by the preferred app; receiving, by the processor, information about which apps and communication protocols are supported by a reader for processing a transaction; locating, by the processor, a secure element supporting an app and a communication protocol supported by the reader; channeling the communication protocol for the specific configuration of the app and the supporting secure element; activating the secure element that supports the app; and processing, with the activated secure element, using the supported app and communication channel, the transaction with the reader.

20 Claims, 3 Drawing Sheets

Related U.S. Application Data continuation of application No. 16/365,108, filed on Mar. 26, 2019, now Pat. No. 10,887,769, which is a continuation of application No. 14/971,684, filed on Dec. 16, 2015, now Pat. No. 10,242,366, which is a continuation of application No. 14/507,343, filed on Oct. 6, 2014, now Pat. No. 9,225,710, which is a continuation of application No. 13/603,242, filed on Sep. 4, 2012, now Pat. No. 8,862,767.

(60) Provisional application No. 61/530,636, filed on Sep. 2, 2011.

(51) Int. Cl.
| | | |
|---|---|---|
| *G06Q 20/32* | (2012.01) | |
| *G06Q 20/34* | (2012.01) | |
| *G06Q 20/40* | (2012.01) | |
| *H04L 9/40* | (2022.01) | |
| *H04L 67/10* | (2022.01) | |
| *H04L 67/1095* | (2022.01) | |
| *H04W 4/60* | (2018.01) | |
| *H04W 4/80* | (2018.01) | |

(52) U.S. Cl.
CPC ..... *G06Q 20/3227* (2013.01); *G06Q 20/3278* (2013.01); *G06Q 20/351* (2013.01); *G06Q 20/405* (2013.01); *H04L 63/04* (2013.01); *H04L 63/08* (2013.01); *H04L 67/10* (2013.01); *H04L 67/1095* (2013.01); *H04W 4/60* (2018.02); *H04W 4/80* (2018.02)

(58) Field of Classification Search
CPC ........... G06Q 20/3227; G06Q 20/3278; G06Q 20/351; G06Q 20/405; G06Q 20/326; H04L 63/04; H04L 63/08; H04L 67/10; H04L 67/1095
See application file for complete search history.

(56) References Cited

U.S. PATENT DOCUMENTS

| | | |
|---|---|---|
| 4,578,777 A | 3/1986 | Fang et al. |
| 4,638,430 A | 1/1987 | Perra et al. |
| 4,698,750 A | 10/1987 | Wilkie et al. |
| 4,718,041 A | 1/1988 | Baglee et al. |
| 4,763,305 A | 8/1988 | Kuo |
| 4,783,766 A | 11/1988 | Samachisa et al. |
| 4,811,294 A | 3/1989 | Kobayashi et al. |
| 4,891,791 A | 1/1990 | Lijima |
| 4,907,202 A | 3/1990 | Kouzi |
| 4,967,393 A | 10/1990 | Yokoyama et al. |
| 4,970,692 A | 11/1990 | Ali et al. |
| 4,999,812 A | 3/1991 | Amin |
| 5,043,940 A | 8/1991 | Harari |
| 5,053,990 A | 10/1991 | Kreifels et al. |
| 5,095,344 A | 3/1992 | Harari |
| 5,168,465 A | 12/1992 | Harari |
| 5,337,280 A | 8/1994 | Tanagawa et al. |
| 5,355,413 A | 10/1994 | Ohno |
| 5,386,539 A | 1/1995 | Nishi |
| 5,467,310 A | 11/1995 | Yoshida et al. |
| 5,523,972 A | 6/1996 | Rashid et al. |
| 5,594,796 A | 1/1997 | Grube et al. |
| 5,602,987 A | 2/1997 | Harari et al. |
| 5,809,143 A | 9/1998 | Hughes |
| 5,864,241 A | 1/1999 | Schreck et al. |
| 5,870,723 A | 2/1999 | Pare, Jr. et al. |
| 5,918,158 A | 6/1999 | LaPorta et al. |
| 5,933,498 A | 8/1999 | Schneck et al. |
| 5,956,473 A | 9/1999 | Ma et al. |
| 5,991,517 A | 11/1999 | Harari et al. |
| 6,026,027 A | 2/2000 | Terrell, II et al. |
| 6,067,529 A | 5/2000 | Ray et al. |
| 6,105,006 A | 8/2000 | Davis et al. |
| 6,138,239 A | 10/2000 | Veil |
| 6,173,332 B1 | 1/2001 | Hickman |
| 6,175,922 B1 | 1/2001 | Wang |
| 6,263,437 B1 | 7/2001 | Liao et al. |
| 6,269,348 B1 | 7/2001 | Pare, Jr. et al. |
| 6,279,069 B1 | 8/2001 | Robinson et al. |
| 6,282,656 B1 | 8/2001 | Wang |
| 6,314,408 B1 | 11/2001 | Salas et al. |
| 6,314,425 B1 | 11/2001 | Serbinis et al. |
| 6,330,546 B1 | 12/2001 | Gopinathan et al. |
| 6,343,323 B1 | 1/2002 | Kalpio et al. |
| 6,415,156 B1 | 7/2002 | Stadelmann |
| 6,516,996 B1 | 2/2003 | Hippelainen |
| 6,570,790 B1 | 5/2003 | Harari |
| 6,581,042 B2 | 6/2003 | Pare, Jr. et al. |
| 6,594,759 B1 | 7/2003 | Wang |
| 6,681,233 B1 | 1/2004 | Ichikawa et al. |
| 6,736,313 B1 | 5/2004 | Dickson |
| 6,804,517 B1 | 10/2004 | Laurila |
| 6,819,219 B1 | 11/2004 | Bolle et al. |
| 6,850,916 B1 | 2/2005 | Wang |
| 6,856,975 B1 | 2/2005 | Inglis |
| 6,898,299 B1 | 5/2005 | Brooks |
| 6,925,568 B1 | 8/2005 | Heinonen |
| 6,999,824 B2 | 2/2006 | Glanzer et al. |
| 7,016,494 B2 | 3/2006 | Hopkins et al. |
| 7,080,039 B1 | 7/2006 | Marsh |
| 7,103,575 B1 | 9/2006 | Linehan |
| 7,107,246 B2 | 9/2006 | Wang |
| 7,155,679 B2 | 12/2006 | Bandaru et al. |
| 7,176,060 B2 | 2/2007 | Yamada et al. |
| 7,206,847 B1 | 4/2007 | Alberth, Jr. et al. |
| 7,251,624 B1 | 7/2007 | Lee et al. |
| 7,251,731 B2 | 7/2007 | Laniepce et al. |
| 7,260,555 B2 | 8/2007 | Rossmann et al. |
| 7,299,498 B2 | 11/2007 | Lee et al. |
| 7,337,976 B2 | 3/2008 | Kawamura et al. |
| 7,350,230 B2 | 3/2008 | Forrest |
| 7,360,691 B2 | 4/2008 | Takayama |
| 7,392,941 B2 | 7/2008 | Choi |
| 7,428,591 B2 | 9/2008 | Stebbings |
| 7,454,194 B2 | 11/2008 | Kuwajima |
| 7,478,248 B2 | 1/2009 | Ziv et al. |
| 7,505,941 B2 | 3/2009 | Bishop et al. |
| 7,512,567 B2 | 3/2009 | Bemmel et al. |
| 7,539,861 B2 | 5/2009 | Trench |
| 7,543,156 B2 | 6/2009 | Campisi |
| 7,543,738 B1 | 6/2009 | Saunders et al. |
| 7,613,427 B2 | 11/2009 | Blight et al. |
| 7,635,084 B2 | 12/2009 | Wang et al. |
| 7,689,497 B2 | 3/2010 | May |
| 7,702,898 B2 | 4/2010 | Tan |
| 7,775,442 B2 | 8/2010 | Saarisalo |
| 7,788,481 B2 | 8/2010 | Bik et al. |
| 7,827,370 B2 | 11/2010 | Ahvenainen et al. |
| 7,844,082 B2 | 11/2010 | Baentsch et al. |
| 7,844,255 B2 | 11/2010 | Petrov et al. |
| 7,860,755 B2 | 12/2010 | Warner |
| 7,873,837 B1 | 1/2011 | Lee et al. |
| 7,877,605 B2 | 1/2011 | Labrou et al. |
| 7,895,311 B1 | 2/2011 | Juenger |
| 7,917,769 B2 | 3/2011 | Campisi |
| 7,937,588 B2 | 5/2011 | Picard et al. |
| 7,945,924 B2 | 5/2011 | Li et al. |
| 7,958,457 B1 | 6/2011 | Brandenberg et al. |
| 7,967,215 B2 | 6/2011 | Kumar et al. |
| 8,016,191 B2 | 9/2011 | Bonalle et al. |
| 8,040,883 B2 | 10/2011 | Keeler et al. |
| 8,099,772 B2 | 1/2012 | Takada et al. |
| 8,108,318 B2 | 1/2012 | Mardikar |
| 8,121,945 B2 | 2/2012 | Rackley, III et al. |
| 8,122,488 B2 | 2/2012 | Hoch et al. |
| 8,149,085 B2 | 4/2012 | Ould |
| 8,150,772 B2 | 4/2012 | Mardikar et al. |
| 8,160,959 B2 | 4/2012 | Rackley, III et al. |
| 8,190,087 B2 | 5/2012 | Fisher et al. |
| 8,230,149 B1 | 7/2012 | Long et al. |

(56) References Cited

U.S. PATENT DOCUMENTS

| | | |
|---|---|---|
| 8,286,241 B1 | 10/2012 | Yeo et al. |
| 8,358,596 B2 | 1/2013 | Byrne et al. |
| 8,385,553 B1 | 2/2013 | Jooste et al. |
| 8,417,643 B2 | 4/2013 | Mardikar |
| 8,423,466 B2 | 4/2013 | Lanc |
| 8,543,091 B2 | 9/2013 | Mardikar |
| 8,554,689 B2 | 10/2013 | Mardikar et al. |
| 8,583,039 B2 | 11/2013 | Kammer |
| 8,583,915 B1 | 11/2013 | Huang |
| 8,646,056 B2 | 2/2014 | Poplett |
| 8,768,854 B2 | 7/2014 | Neville et al. |
| 8,862,767 B2 | 10/2014 | Taveau et al. |
| 8,863,256 B1 | 10/2014 | Addepalli et al. |
| 8,925,106 B1 | 12/2014 | Steiner et al. |
| 9,037,676 B1 | 5/2015 | Lundh et al. |
| 9,060,271 B2 | 6/2015 | Mardikar |
| 9,097,544 B2 | 8/2015 | Dhanani et al. |
| 9,098,844 B2 | 8/2015 | Davis et al. |
| 9,143,622 B2 | 9/2015 | Sprigg et al. |
| 9,165,125 B2 | 10/2015 | Zarei et al. |
| 9,185,234 B2 | 11/2015 | Horel et al. |
| 9,185,538 B2 | 11/2015 | Oliver et al. |
| 9,232,077 B2 | 1/2016 | Yu et al. |
| 9,450,759 B2 | 9/2016 | Hauck et al. |
| 9,537,839 B2 | 1/2017 | Mardikar |
| 9,558,481 B2 | 1/2017 | Bauer et al. |
| 9,836,735 B2 | 12/2017 | Vilmos et al. |
| 9,852,418 B2 | 12/2017 | Mardikar |
| 9,858,566 B2 | 1/2018 | Mardikar et al. |
| 10,083,446 B2 | 9/2018 | Taveau et al. |
| 10,242,366 B2 | 3/2019 | Taveau et al. |
| 10,382,331 B1 | 8/2019 | Sivaramakrishnan |
| 10,546,298 B2 | 1/2020 | Quiroga et al. |
| 2001/0018660 A1 | 8/2001 | Sehr |
| 2001/0049785 A1 | 12/2001 | Kawan et al. |
| 2002/0007320 A1 | 1/2002 | Hogan et al. |
| 2002/0023215 A1 | 2/2002 | Wang et al. |
| 2002/0032905 A1 | 3/2002 | Sherr et al. |
| 2002/0059530 A1 | 5/2002 | Talvitie |
| 2002/0099649 A1 | 7/2002 | Lee et al. |
| 2002/0111918 A1 | 8/2002 | Hoshino et al. |
| 2002/0133467 A1 | 9/2002 | Hobson et al. |
| 2002/0152390 A1 | 10/2002 | Furuyama et al. |
| 2002/0161723 A1 | 10/2002 | Asokan et al. |
| 2002/0164023 A1 | 11/2002 | Koelle et al. |
| 2002/0165811 A1 | 11/2002 | Ishii et al. |
| 2002/0194499 A1 | 12/2002 | Audebert et al. |
| 2003/0028484 A1 | 2/2003 | Boylan et al. |
| 2003/0037264 A1 | 2/2003 | Ezaki et al. |
| 2003/0055792 A1 | 3/2003 | Kinoshita et al. |
| 2003/0076955 A1 | 4/2003 | Alve et al. |
| 2003/0076962 A1 | 4/2003 | Roh et al. |
| 2003/0101071 A1 | 5/2003 | Salonen |
| 2003/0110131 A1 | 6/2003 | Alain et al. |
| 2003/0120601 A1 | 6/2003 | Ouye et al. |
| 2003/0123669 A1 | 7/2003 | Koukoulidis et al. |
| 2003/0145205 A1 | 7/2003 | Sarcanin |
| 2003/0154405 A1 | 8/2003 | Harrison |
| 2003/0163710 A1 | 8/2003 | Ortiz et al. |
| 2003/0167207 A1 | 9/2003 | Berardi et al. |
| 2003/0171993 A1 | 9/2003 | Chappuis |
| 2003/0172090 A1 | 9/2003 | Asunmaa et al. |
| 2003/0187784 A1 | 10/2003 | Maritzen et al. |
| 2003/0190908 A1 | 10/2003 | Craven |
| 2003/0191709 A1 | 10/2003 | Elston et al. |
| 2003/0233462 A1 | 12/2003 | Chien |
| 2003/0236981 A1 | 12/2003 | Marmigere et al. |
| 2004/0002350 A1 | 1/2004 | Gopinath et al. |
| 2004/0015445 A1 | 1/2004 | Heaven et al. |
| 2004/0059921 A1 | 3/2004 | Bianchi |
| 2004/0059923 A1 | 3/2004 | Shamrao |
| 2004/0068649 A1 | 4/2004 | Haller et al. |
| 2004/0073925 A1 | 4/2004 | Kinoshita |
| 2004/0107368 A1 | 6/2004 | Colvin |
| 2004/0117631 A1 | 6/2004 | Colvin |
| 2004/0117644 A1 | 6/2004 | Colvin |
| 2004/0117664 A1 | 6/2004 | Colvin |
| 2004/0124966 A1 | 7/2004 | Forrest |
| 2004/0133797 A1 | 7/2004 | Arnold |
| 2004/0157584 A1 | 8/2004 | Bensimon et al. |
| 2004/0181463 A1 | 9/2004 | Goldthwaite et al. |
| 2004/0182921 A1 | 9/2004 | Dickson et al. |
| 2004/0186993 A1 | 9/2004 | Risan et al. |
| 2004/0194100 A1 | 9/2004 | Nakayama et al. |
| 2004/0230536 A1 | 11/2004 | Fung et al. |
| 2004/0243634 A1 | 12/2004 | Levy |
| 2004/0268133 A1 | 12/2004 | Lee et al. |
| 2004/0268142 A1 | 12/2004 | Karjala et al. |
| 2005/0027999 A1 | 2/2005 | Pelly et al. |
| 2005/0033688 A1 | 2/2005 | Peart et al. |
| 2005/0033988 A1 | 2/2005 | Chandrashekhar et al. |
| 2005/0070248 A1 | 3/2005 | Gaur |
| 2005/0097059 A1 | 5/2005 | Shuster |
| 2005/0102381 A1 | 5/2005 | Jiang et al. |
| 2005/0105734 A1 | 5/2005 | Buer et al. |
| 2005/0156708 A1 | 7/2005 | Puranik et al. |
| 2005/0171898 A1 | 8/2005 | Bishop et al. |
| 2005/0182710 A1 | 8/2005 | Andersson et al. |
| 2005/0187782 A1 | 8/2005 | Grear et al. |
| 2005/0187883 A1 | 8/2005 | Bishop et al. |
| 2005/0190912 A1 | 9/2005 | Hopkins et al. |
| 2005/0222949 A1 | 10/2005 | Inotay et al. |
| 2005/0240778 A1 | 10/2005 | Saito |
| 2005/0242177 A1 | 11/2005 | Roberge et al. |
| 2005/0246253 A1 | 11/2005 | Barthelemy |
| 2005/0251582 A1 | 11/2005 | Goel et al. |
| 2005/0273399 A1 | 12/2005 | Soma et al. |
| 2005/0273609 A1 | 12/2005 | Eronen |
| 2005/0289078 A1 | 12/2005 | Wary et al. |
| 2006/0005033 A1 | 1/2006 | Wood |
| 2006/0010075 A1 | 1/2006 | Wolf |
| 2006/0015580 A1 | 1/2006 | Gabriel et al. |
| 2006/0023486 A1 | 2/2006 | Furusawa et al. |
| 2006/0079284 A1 | 4/2006 | Lu et al. |
| 2006/0080259 A1 | 4/2006 | Wajs |
| 2006/0080548 A1 | 4/2006 | Okamura et al. |
| 2006/0080549 A1 | 4/2006 | Okamura et al. |
| 2006/0098678 A1 | 5/2006 | Tan |
| 2006/0115084 A1 | 6/2006 | Ryu |
| 2006/0122902 A1 | 6/2006 | Petrov et al. |
| 2006/0136332 A1 | 6/2006 | Ziegler |
| 2006/0136735 A1 | 6/2006 | Plotkin et al. |
| 2006/0149727 A1 | 7/2006 | Viitaharju |
| 2006/0161635 A1 | 7/2006 | Lamkin et al. |
| 2006/0170530 A1 | 8/2006 | Nwosu et al. |
| 2006/0183462 A1 | 8/2006 | Kolehmainen |
| 2006/0183489 A1 | 8/2006 | Modeo |
| 2006/0265743 A1 | 11/2006 | Kusunoki et al. |
| 2006/0272031 A1 | 11/2006 | Ache et al. |
| 2006/0285659 A1 | 12/2006 | Suryanarayana et al. |
| 2006/0287004 A1 | 12/2006 | Fuqua |
| 2006/0294007 A1 | 12/2006 | Barthelemy |
| 2007/0011242 A1 | 1/2007 | McFarland et al. |
| 2007/0011724 A1 | 1/2007 | Gonzalez et al. |
| 2007/0019622 A1 | 1/2007 | Alt et al. |
| 2007/0022058 A1 | 1/2007 | Labrou et al. |
| 2007/0033149 A1 | 2/2007 | Kanngard et al. |
| 2007/0033408 A1 | 2/2007 | Morten |
| 2007/0050871 A1 | 3/2007 | Mashhour |
| 2007/0052517 A1 | 3/2007 | Bishop et al. |
| 2007/0057038 A1 | 3/2007 | Gannon |
| 2007/0067535 A1 | 3/2007 | Liu |
| 2007/0078773 A1 | 4/2007 | Czerniak |
| 2007/0080784 A1 | 4/2007 | Kim et al. |
| 2007/0092112 A1 | 4/2007 | Awatsu et al. |
| 2007/0092114 A1 | 4/2007 | Ritter et al. |
| 2007/0106892 A1 | 5/2007 | Engberg |
| 2007/0106897 A1 | 5/2007 | Kulakowski |
| 2007/0112667 A1 | 5/2007 | Rucker |
| 2007/0136211 A1 | 6/2007 | Brown et al. |
| 2007/0143828 A1 | 6/2007 | Jeal et al. |
| 2007/0175023 A1 | 8/2007 | Heitmann et al. |
| 2007/0197261 A1 | 8/2007 | Humbel |
| 2007/0198837 A1 | 8/2007 | Koodli et al. |

(56) References Cited

U.S. PATENT DOCUMENTS

| | | |
|---|---|---|
| 2007/0203841 A1 | 8/2007 | Maes |
| 2007/0219926 A1 | 9/2007 | Korn |
| 2007/0220273 A1 | 9/2007 | Campisi |
| 2007/0221725 A1 | 9/2007 | Kawaguchi |
| 2007/0233875 A1 | 10/2007 | Raghav et al. |
| 2007/0234034 A1 | 10/2007 | Leone et al. |
| 2007/0234291 A1 | 10/2007 | Ronen et al. |
| 2007/0235539 A1 | 10/2007 | Sevanto et al. |
| 2007/0239869 A1 | 10/2007 | Raghav et al. |
| 2007/0245148 A1 | 10/2007 | Buer |
| 2007/0254712 A1 | 11/2007 | Chitti |
| 2007/0255652 A1 | 11/2007 | Tumminaro et al. |
| 2007/0255662 A1 | 11/2007 | Tumminaro |
| 2007/0260558 A1 | 11/2007 | Look |
| 2007/0271596 A1 | 11/2007 | Boubion et al. |
| 2007/0286373 A1 | 12/2007 | Pailles et al. |
| 2007/0293202 A1 | 12/2007 | Moshir et al. |
| 2007/0295803 A1 | 12/2007 | Levine et al. |
| 2008/0006685 A1 | 1/2008 | Rackley, III et al. |
| 2008/0010678 A1 | 1/2008 | Burdette et al. |
| 2008/0046366 A1 | 2/2008 | Bemmel et al. |
| 2008/0046915 A1 | 2/2008 | Haeuser et al. |
| 2008/0046988 A1 | 2/2008 | Baharis et al. |
| 2008/0052091 A1 | 2/2008 | Vawter |
| 2008/0064346 A1 | 3/2008 | Charrat |
| 2008/0065531 A1 | 3/2008 | Smith et al. |
| 2008/0065885 A1 | 3/2008 | Nagai et al. |
| 2008/0076572 A1 | 3/2008 | Nguyen et al. |
| 2008/0091614 A1 | 4/2008 | Bas Bayod et al. |
| 2008/0091681 A1 | 4/2008 | Dwivedi et al. |
| 2008/0119162 A1 | 5/2008 | Sivalingam et al. |
| 2008/0121687 A1 | 5/2008 | Buhot |
| 2008/0129450 A1 | 6/2008 | Riegebauer |
| 2008/0130895 A1 | 6/2008 | Jueneman et al. |
| 2008/0144650 A1 | 6/2008 | Boch et al. |
| 2008/0147508 A1 | 6/2008 | Liu et al. |
| 2008/0155268 A1 | 6/2008 | Jazayeri et al. |
| 2008/0167961 A1 | 7/2008 | Wentker et al. |
| 2008/0168273 A1 | 7/2008 | Chung et al. |
| 2008/0170691 A1 | 7/2008 | Chang et al. |
| 2008/0189212 A1 | 8/2008 | Kulakowski et al. |
| 2008/0201264 A1 | 8/2008 | Brown et al. |
| 2008/0207124 A1 | 8/2008 | Raisanen et al. |
| 2008/0222038 A1 | 9/2008 | Eden et al. |
| 2008/0230615 A1 | 9/2008 | Read et al. |
| 2008/0238610 A1 | 10/2008 | Rosenberg |
| 2008/0242267 A1 | 10/2008 | Soni et al. |
| 2008/0268811 A1 | 10/2008 | Beenau et al. |
| 2008/0270302 A1 | 10/2008 | Beenau et al. |
| 2008/0270307 A1 | 10/2008 | Olson et al. |
| 2008/0275748 A1 | 11/2008 | John |
| 2008/0279381 A1 | 11/2008 | Narendra et al. |
| 2008/0287162 A1 | 11/2008 | Gaillard et al. |
| 2008/0288405 A1 | 11/2008 | John |
| 2008/0289006 A1 | 11/2008 | Hock et al. |
| 2008/0289030 A1 | 11/2008 | Poplett |
| 2008/0297311 A1 | 12/2008 | Wu |
| 2008/0306828 A1 | 12/2008 | Chao |
| 2008/0319896 A1 | 12/2008 | Carlson et al. |
| 2009/0018934 A1 | 1/2009 | Peng et al. |
| 2009/0023474 A1 | 1/2009 | Luo et al. |
| 2009/0046069 A1 | 2/2009 | Griffin et al. |
| 2009/0048916 A1 | 2/2009 | Nuzum et al. |
| 2009/0065571 A1 | 3/2009 | Jain |
| 2009/0070263 A1 | 3/2009 | Davis et al. |
| 2009/0099961 A1 | 4/2009 | Ogilvy |
| 2009/0143104 A1 | 6/2009 | Loh et al. |
| 2009/0144161 A1 | 6/2009 | Fisher |
| 2009/0164799 A1 | 6/2009 | Takagi |
| 2009/0165031 A1 | 6/2009 | Li et al. |
| 2009/0171970 A1 | 7/2009 | Keefe |
| 2009/0182676 A1 | 7/2009 | Barbier et al. |
| 2009/0191846 A1 | 7/2009 | Shi |
| 2009/0196465 A1 | 8/2009 | Menon |
| 2009/0222902 A1 | 9/2009 | Bender et al. |
| 2009/0233579 A1 | 9/2009 | Castell et al. |
| 2009/0261172 A1 | 10/2009 | Kumar et al. |
| 2009/0265552 A1 | 10/2009 | Moshir et al. |
| 2009/0273435 A1 | 11/2009 | Ould |
| 2009/0286509 A1 | 11/2009 | Huber et al. |
| 2009/0305673 A1 | 12/2009 | Mardikar |
| 2009/0307139 A1 | 12/2009 | Mardikar et al. |
| 2009/0307142 A1 | 12/2009 | Mardikar |
| 2009/0323673 A1 | 12/2009 | Gabbay et al. |
| 2009/0327131 A1 | 12/2009 | Beenau et al. |
| 2010/0029200 A1 | 2/2010 | Varriale et al. |
| 2010/0029202 A1 | 2/2010 | Jolivet et al. |
| 2010/0050271 A1 | 2/2010 | Saarisalo |
| 2010/0088227 A1 | 4/2010 | Belamant |
| 2010/0117791 A1 | 5/2010 | Inoue et al. |
| 2010/0125737 A1 | 5/2010 | Kang |
| 2010/0138365 A1 | 6/2010 | Hirvela et al. |
| 2010/0159962 A1 | 6/2010 | Cai et al. |
| 2010/0199327 A1 | 8/2010 | Keum et al. |
| 2010/0223472 A1 | 9/2010 | Alvarsson |
| 2010/0235277 A1 | 9/2010 | Van Rensburg et al. |
| 2010/0274677 A1* | 10/2010 | Florek ............... G06Q 20/3226 |
| | | 705/16 |
| 2011/0078081 A1 | 3/2011 | Pirzadeh et al. |
| 2011/0087610 A1 | 4/2011 | Batada et al. |
| 2011/0112968 A1 | 5/2011 | Florek et al. |
| 2011/0117883 A1 | 5/2011 | Drabo |
| 2011/0138192 A1 | 6/2011 | Kocher et al. |
| 2011/0143663 A1* | 6/2011 | Renard ............ G06Q 20/38215 |
| | | 455/41.1 |
| 2011/0179284 A1 | 7/2011 | Suzuki et al. |
| 2011/0197059 A1 | 8/2011 | Klein et al. |
| 2011/0208761 A1 | 8/2011 | Zybura et al. |
| 2011/0213665 A1 | 9/2011 | Joa et al. |
| 2011/0238578 A1 | 9/2011 | Hurry |
| 2011/0276638 A1 | 11/2011 | Errico et al. |
| 2012/0002810 A1 | 1/2012 | Imming et al. |
| 2012/0029990 A1 | 2/2012 | Fisher |
| 2012/0066346 A1 | 3/2012 | Virmani et al. |
| 2012/0078735 A1 | 3/2012 | Bauer et al. |
| 2012/0089520 A1 | 4/2012 | Mardikar |
| 2012/0096077 A1* | 4/2012 | Weerts ................ G06F 9/5077 |
| | | 709/203 |
| 2012/0096535 A1 | 4/2012 | Popp et al. |
| 2012/0196529 A1 | 8/2012 | Huomo et al. |
| 2012/0209852 A1 | 8/2012 | Dasgupta et al. |
| 2012/0215747 A1 | 8/2012 | Wang |
| 2012/0244805 A1 | 9/2012 | Haikonen et al. |
| 2013/0046761 A1 | 2/2013 | Soderberg et al. |
| 2013/0054459 A1 | 2/2013 | Granbery |
| 2013/0060661 A1 | 3/2013 | Block et al. |
| 2013/0074046 A1 | 3/2013 | Sharma et al. |
| 2013/0144968 A1 | 6/2013 | Berger |
| 2013/0198086 A1 | 8/2013 | Mardikar |
| 2014/0006486 A1 | 1/2014 | Bintliff |
| 2014/0025520 A1 | 1/2014 | Mardikar et al. |
| 2014/0052532 A1 | 2/2014 | Tsai et al. |
| 2014/0185806 A1 | 7/2014 | Mardikar |
| 2014/0208099 A1 | 7/2014 | Rajsic |
| 2014/0372323 A1 | 12/2014 | Balasubramanian et al. |
| 2015/0026781 A1 | 1/2015 | Taveau et al. |
| 2015/0056957 A1 | 2/2015 | Mardikar et al. |
| 2015/0220932 A1 | 8/2015 | Mardikar et al. |
| 2015/0227932 A1 | 8/2015 | Huxham et al. |
| 2015/0281191 A1 | 10/2015 | Mardikar |
| 2016/0026991 A1 | 1/2016 | Murdoch et al. |
| 2016/0125415 A1 | 5/2016 | Mardikar et al. |
| 2016/0224984 A1 | 8/2016 | Mardikar et al. |
| 2016/0253670 A1 | 9/2016 | Kim et al. |
| 2017/0111797 A1 | 4/2017 | Mardikar |
| 2017/0237829 A1 | 8/2017 | Kirkeby et al. |
| 2018/0054438 A1 | 2/2018 | Li et al. |
| 2018/0101678 A1 | 4/2018 | Rosa |
| 2018/0130548 A1 | 5/2018 | Fisher |
| 2018/0211236 A1 | 7/2018 | Rutherford et al. |
| 2019/0057115 A1 | 2/2019 | Liu et al. |
| 2019/0097975 A1 | 3/2019 | Martz et al. |
| 2020/0034830 A1 | 1/2020 | Ortiz et al. |

(56) References Cited

U.S. PATENT DOCUMENTS

| | | | |
|---|---|---|---|
| 2020/0279258 A1 | 9/2020 | Agrawal et al. |
| 2021/0056524 A1 | 2/2021 | Isgar |
| 2021/0258395 A1 | 8/2021 | Saito |

FOREIGN PATENT DOCUMENTS

| | | | |
|---|---|---|---|
| EP | 1737181 A1 | 12/2006 |
| EP | 2034428 A1 | 3/2009 |
| GB | 2396472 A | 6/2004 |
| WO | 0178493 A2 | 10/2001 |
| WO | 2006113834 A2 | 10/2006 |
| WO | 2008034937 A1 | 3/2008 |
| WO | 2009138848 A2 | 11/2009 |

OTHER PUBLICATIONS

Atmel., "Understanding the Requirements of ISO/IEC 14443 for Type B Proximity Contactless Identification Cards", Retrieved from the internet: http://www.atmel.com/dyn/resources/prod.documents/doc2056.pdf, Nov. 2005, 28 pages.

Baddeley D., "ISO/IEC 14443-3 Identification Cards—Contactless Integrated Circuit(s) Cards—Proximity Cards—Part 3: Initialization and Anticollision", Retrieved from Internet: http://www.waaza.org/download/fcd-14443-3.pdf, Jun. 11, 1999, 48 pages.

Chinese Appl. No. 200980121058.9, English Translation of Chinese Office Action, dated Dec. 12, 2011, 8 pages.

Chinese Appl. No. 200980121058.9, English Translation of Second Chinese Office Action, dated May 18, 2012, 10 pages.

Erfahrungen M., et al., "NFC = Simplicity", Nokia, 2007, Retrieved from the Internet: http://www.hccomp.eu/files/NFC-4.pdf, 18 pages.

European Appl. No. 09773993.2, Extended European Search Report dated Oct. 7, 2013, 7 pages.

Gralla P., "How Wireless Works", 2nd Edition, Que Corporation, Oct. 24, 2005, 56 pages.

Grillo A., et al., "Transaction Oriented Text Messaging with Trusted-SMS," 2008 Annual Computer Security Applications Conference (ACSAC), Dec. 2008, 10 pages.

Hassinen M., "Java based Public Key Infrastructure for SMS Messaging", Department of Computer Science, 2006, 6 pages.

International Appl. No. PCT/US2009/046322, International Search Report and Written Opinion dated Nov. 10, 2009, 7 pages.

International Appl. No. PCT/US2009/046450, International Search Report and Written Opinion dated Jul. 28, 2009, 7 pages.

International Preliminary Report on Patentability for Application No. PCT/US2009/046450 dated Dec. 16, 2010, 7 pages.

International Preliminary Report on Patentability for Application No. PCT/US2009/046322 dated Dec. 16, 2010, 7 pages.

"ISO8583 Message Format Specification Version 3.0", Trusted Security Solutions, Sep. 21, 2005, 11 Pages.

Me G., "Security Overview for M-Payed Virtual Ticketing," The 14th IEEE 2003 International Symposium on Personal, Indoor and Mobile Radio Communication Proceedings, 2003, 5 pages.

"Merriam-Webster's Collegiate Dictionary," 10th Edition, 1993, 1 page.

"Mobile NFC Services Version 1.0", GSMA, Feb. 2007, 24 Pages.

"Mobile NFC technical Guidelines Version 2.0", GSMA, Nov. 2007, 24 Pages.

"NFC—The Technology| Mobile NFC", Aug. 8, 2012, Retrieved from the Internet: http://www.gsma.com/mobilenfc/nfc-the-technology/, 2 pages.

"Pay-Buy Mobile Business Opportunity Analysis Public White Paper", Version 1.0, GSMA, Nov. 2007, 36 pages.

"Reader Series 4000: S4100 Multi-Function Reader Module RF-MGR-MNMN ISO 14443 Library Reference Guide", Texas Instrument, Oct. 2003, Retrieved from the Internet: http://www.ti.com/rfid/docs/manuals/refmanuals/RF-MGR-MNMN-14443-refGuide.pdf, 58 pages.

Reference Shelf., "Secure," Webster's Dictionary: Full Text, Jun. 9, 2011, 2 pages.

Reference Shelf, "Separate," Webster Dictionary: Full Text, Jun. 9, 2011, 2 pages.

Smartcardalliance., "Contactless Technology for Secure Physical Access: Technology and Standards Choices", Smart Card Alliance Report, Oct. 2002, Retrieved from the Internet: https://www.securetechalliance.org/resources/lib/Contactless.sub-Technology.Report.pdf, 48 pages.

Strunk W., et al., "The Elements of Style Third Edition", MacMillan Publishing Co Inc, 1979, 3 pages.

U.S. Appl. No. 60/974,424, filed Sep. 21, 2007, 15 pages.

"Webster's New World Dictionary, Third College Edition," 1988, 1 page.

White R., "How Computers Work", 9th Edition, Que Corporation, Nov. 14, 2007, 75 pages.

White R., "How Computers Work", Illustrated by Timothy Edward Downs, Que Publishing, 7th Edition, Oct. 15, 2003, 23 pages.

White R., "How Software Works", Illustrated by Pamela Drury Wattenmaker, 1993, 68 pages.

Wikipedia., "FIPS 140-2", Federal Information Processing Standard (FIPS), May 25, 2001, Retrieved From the Internet: https://en.wikipedia.org/wiki/FIPS_140-2, 6 pages.

Wikipedia., "FIPS PUB 140-2", National Institute of Standards and Technology (NIST), May 25, 2001, Retrieved from Internet URL: http://csrc.nist.gov/publications/fips/fips140-2/fips1402.pdf, 6 pages.

Chinese Appl. No. 200980121058.9, Chinese Version of Office Action dated Dec. 12, 2011, 5 pages.

Chinese Appl. No. 200980121058.9, Chinese Version of Second Office Action, dated May 18, 2012, 6 pages.

* cited by examiner

|  |  | UICC |  |  |  | eSE/mSD |  |  |  | vSE |  |  |  |
|---|---|---|---|---|---|---|---|---|---|---|---|---|---|
|  |  | App1 | App2 | App3 | App4 | App1 | App2 | App3 | App4 | Trustlet1 | Trustlet2 | Trustlet3 | Trustlet4 |
| Protocols | CE |  | X |  |  |  |  |  |  |  |  |  |  |
|  | LLCP |  |  | X |  | X |  |  |  |  |  |  |  |
|  | NDEF | X |  |  | X |  |  |  |  |  |  |  |  |
| Kernel | 1 Visa |  |  | X |  |  | X |  |  |  | X |  |  |
|  | 2 MC |  |  |  | X |  |  | X |  |  |  |  |  |
|  | 3 Amex |  |  |  |  |  | X |  | X |  |  |  |  |
|  | 4 PP |  | X |  |  | X |  |  |  |  |  |  |  |
|  | 5 Google |  |  | X |  |  |  |  |  |  |  | X |  |
|  | 6 Isis | X |  |  |  |  |  |  |  |  |  |  | X |
| Preferences | Reward |  | X |  |  |  |  |  |  | X |  |  |  |
|  | Coupon | X |  |  |  |  |  |  |  | X |  |  |  |

FIG. 3

SECURE ELEMENTS BROKER (SEB) FOR APPLICATION COMMUNICATION CHANNEL SELECTOR OPTIMIZATION

CROSS REFERENCE TO RELATED APPLICATIONS

This application is a continuation application of U.S. patent application Ser. No. 17/140,872, filed Jan. 4, 2021, which in turn is a continuation of U.S. patent application Ser. No. 16/365,108, filed Mar. 26, 2019, now U.S. Pat. No. 10,887,769, issued Jan. 5, 2021, which in turn is a continuation of U.S. patent application Ser. No. 14/971,684, filed Dec. 16, 2015, now U.S. Pat. No. 10,242,366, issued Mar. 26, 2019, which in turn is a continuation application of U.S. patent application Ser. No. 14/507,343, filed Oct. 6, 2014, now U.S. Pat. No. 9,225,710, issued Dec. 29, 2015, which in turn is a continuation application of co-pending U.S. patent application Ser. No. 13/603,242, filed Sep. 4, 2012, now U.S. Pat. No. 8,862,767, issued Oct. 14, 2014, and claims the benefit of priority from U.S. Provisional Patent Application No. 61/530,636, filed Sep. 2, 2011. The present application is related to U.S. patent application Ser. No. 14/529,604, filed Oct. 31, 2014, and U.S. Ser. No. 14/529,775, filed Oct. 31, 2014, the disclosures of which are incorporated by reference in their entirety.

BACKGROUND

Technical Field

Embodiments of the present invention generally relate to commerce using a consumer mobile device and wireless communication and, more particularly, to managing concurrent secure elements on the mobile device to coordinate with an application or "app" running on the mobile device and an appropriate communications protocol for conducting transactions using the mobile device.

Related Art

One issue with today's mobile device or consumer electronic devices is that most of the time, the devices can handle only one secure element (SE). A secure element may be briefly described as a system for storing private data—such as a digital identification (ID) of the payer, e.g., user of the mobile device—in such a way that it is very difficult to compromise. For example, a secure element of a device may be located in a Universal Integrated Circuit Card (UICC), a Subscriber Identity Module (SIM) card, Secure Data (SD) card or embedded Secure Element (eSE), any of which may be plugged into or otherwise connected with the mobile device. With smart phones, it is becoming more and more common to see two or more secure elements in a single device. Current rules—such as those promulgated by standardization bodies like GlobalPlatform—allow only one SE to be active at a time or require one SE to be dominant while the other SEs are slaves.

BRIEF DESCRIPTION OF THE DRAWINGS

FIG. 3 is an example of a matrix diagram illustrating a portion of a system for managing concurrent secure elements on a mobile device in accordance with an embodiment.

Figure 1:
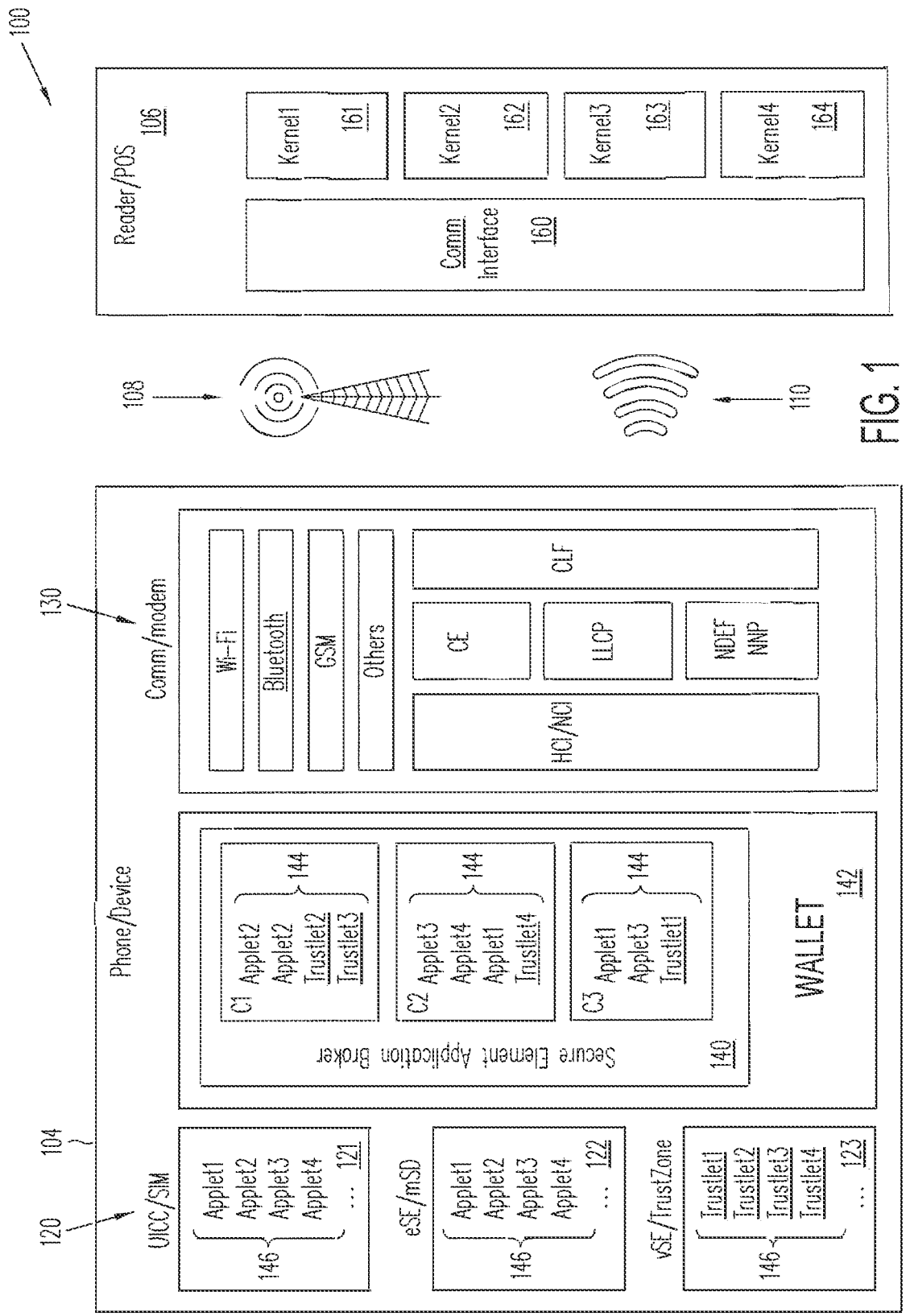
FIG. 1 is a system block diagram illustrating a system for managing concurrent secure elements on a mobile device in accordance with one or more embodiments of the present invention.

Embodiments of the present disclosure and their advantages are best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

Broadly speaking, methods and systems according to one or more embodiments provide for managing concurrent secure elements on a mobile device to coordinate with an application or "app" running on the mobile device and an appropriate communications protocol for conducting transactions using the mobile device. One embodiment provides a mechanism for allowing the selection of a proper communication protocol linked to a specific "secured" application (e.g., an application residing in a secure element) even within a multi-SE and multi-application environment.

In one or more embodiments, a secure elements broker (SEB) may operate in multi-SE environment (e.g., a mobile device having more than one functioning SE) by regarding all SEs as being in "sleeping mode" and with an SE being called upon by the secure elements broker only when an app that uses the called SE is requested or launched. This operating principle may allow better management of concurrent SEs and their functions, create equality and priority among the concurrent SEs based on optimized connectivity and selection, organize one or more multi-storage zones for secure application content, and circumvent the issue of which SE should always be on. While future secure element architectures may allow for concurrent SEs to run simultaneously, this operating principle of a secure elements broker would still be valid and provide similar advantages.

Moreover, while a "physical" result (such as SE calls in hardware) may occur from using the secure elements broker, the secure elements broker also employs logical functions, for example, managing containers of lists either via logs by application or via preferences by user. For example, the secure elements broker may reside and execute from within a "wallet" (e.g., a virtual wallet on a mobile device that allows a user to easily use various mobile apps and organize them into "containers") as an underlying mechanism. The applications may be marked with a special identifying mechanism at the communication protocol level. Then similar apps, regardless of which secure element they are stored in, may be "listed" in a container from within the secure elements broker. When the device is presented to a reader, e.g., at a point of sale (POS), or other device requesting a communication via a specific channel (e.g., Wi-Fi vs. Bluetooth), the secure elements broker may answer by (figuratively) saying "here is the list of apps I know about in container X that support your protocol." At that point, an application selection may be triggered and the proper SE may be "powered up" to deliver the real app, e.g., the applet in the secure element that selected app calls on. Thus, even if the secure elements broker is broken (e.g., security compromised, "hacked") it would still not be possible to use that compromise in order to access the real (e.g., the secure element-residing applet) app.

In another alternative embodiment, the secure elements broker mechanism may be moved one level up in the wallet, giving the user a way to organize his or her apps in the wallet based on various use cases (e.g., apps for transit, apps for payment, apps for fun).

In one or more embodiments, methods, systems, and computer program products are provided for managing concurrent secure elements on a mobile device to coordinate with an application or "app" running on the mobile device and an appropriate communications protocol for conducting transactions using the mobile device. For example, a method may include: informing, by the processor, the reader device of a preferred app and a communication protocol usable by the preferred app; receiving, by the processor, information about which apps and communication protocols are supported by a reader for processing a transaction; locating, by the processor, a secure element supporting an app and a communication protocol supported by the reader; channeling the communication protocol for the specific configuration of the app and the supporting secure element; activating the secure element that supports the app; and processing, with the activated secure element, using the supported app and communication channel, the transaction with the reader.

FIG. 1 illustrates a system 100 for managing concurrent secure elements on a mobile device in accordance with one or more embodiments. System 100 may include a mobile device 104, e.g., a consumer electronic device such as a mobile phone or smartphone. Mobile device 104 may be enabled for various forms of communication such as, for example, Wi-Fi, Bluetooth, Global System for Mobile (GSM), or near-field communication (NFC). Thus mobile device 104 may communicate with reader 106 (e.g., a point of sale (POS) terminal) using a wireless protocol via a wireless communication channel 108, for example, or using an NFC protocol via an NFC channel 110. Between the two devices, the communication channels are illustrated by a telco tower (for wireless communication channel 108) and the contactless symbol (for NFC channel 110) to illustrate that the range of connectivity is not limited to one mode or the other because the secure elements broker 140 could be used in a proximity or a remote mode. In addition, a "hard wired" connected mode is also possible.

Mobile device 104 may include a security area 120. Security area 120 may include any combination of secure elements 121, 122, 123. For example, a UICC or SIM card secure element 121, usually controlled by carriers or networks; an embedded Secure Element (eSE) or micro-SD (mSD) card secure element 122, usually controlled by handset makers or service providers; or a virtual Secure Element (vSE) or Trust Zone secure element 123.

Mobile device 104 may include a communication module 130. Communication module 130 may integrate modem-like functionalities and may be a portion of system 100 that "connects" the mobile device 104 to another device such as reader device 106. Communication module 130 may integrate hardwire connected, radio-frequency, and contactless (e.g., NFC) ways to communicate between devices. It may be noted that these various communication means may reside within or be implemented using different physical components. As seen in FIG. 1, communication module 130 may implement communication in using a multiplicity of systems and protocols. For example, communication module 130 may implement communication using wireless systems such as: Wi-Fi, Bluetooth, GSM, or others, and using NFC (or contactless) systems and protocols such as HCI (Host Controller Interface), NCI (NFC Controller Interface); CE (Card Emulation) mode; P2P (peer-to-peer); LLCP (Logical Link Control Protocol); NFCIP-1 (NFC Interchange and Protocol-1); NDEF (NFC Data Exchange Format); NPP (NDEF Push Protocol); SNEP (Simple NDEF Exchange Protocol); or CLF (Contactless Front End).

Mobile device 104 may include a secure elements broker 140. Secure elements broker 140 may be implemented, for example, as a process executing on mobile device 104 and may, for example, be physically embodied as computer readable and executable instructions stored in a memory of mobile device 104. Secure elements broker 140 may be considered as a logical technology with the ability to use existing hardware components and functions (e.g., low-level drivers). To do so, it may be an underlying component to an existing application (e.g. wallet 142) or integrated at the operating system (OS) level (e.g., Android). In some instances, it may be possible for specific devices to have the secure elements broker 140 be executed from a secure OS launched at boot up time in parallel with unsecure normal OS operations.

The secure elements broker 140 internal logic may allow for the creation of containers (e.g., C1, C2, C3 shown in FIG. 1) that may provide an area to store a list or lists 144 of applications executed from secure elements (e.g., applets or trustlets 146 shown in FIG. 1). These containers (e.g., C1, C2, C3) may be assigned to various functions, such as specific communication channels, specific payment kernels (e.g., Visa, MasterCard, PayPal), specific services (transit, access, payments). Thus, secure elements broker 140 may create an index list of available secure applications with a smart location mapping of these applications within the devices, for example, in a multi-SE environment. The role of the secure elements broker 140 may be to point to the right path, during the selection process, for which one or more applications are optimized for a specific call (e.g., a transaction conducted between mobile device 104 and reader device 106) and to make sure the activation or wake-up signal is sent to the SE containing such applications (or apps). In order to connect to the proper SE, the secure elements broker 140 may be able (if authorized) to read low-level drivers and potentially turn them on or off to wake up the proper SEs. The relevant protocols may include i2C, SCI, SWP, or others, as known in the art.

System 100 may include a reader device 106, e.g., a card reader or wireless terminal located at a point of sale (POS). Reader device 106 may include a communication interface 160 that may be similar to communication module 130. Reader device 106 may include kernels 161, 162, 163, 164 that would expect to find counterparts in a device (e.g., mobile device 104) calling upon them. However, a kernel may be able to "read" multiple applications on the mobile side (e.g., from mobile device 104). Hence, the secure elements broker 140 may present the best option to the reader kernel (e.g., whichever one of kernels 161, 162, 163, 164 that is active) based on preferences and settings (see, for example, FIG. 3).

Figure 2:
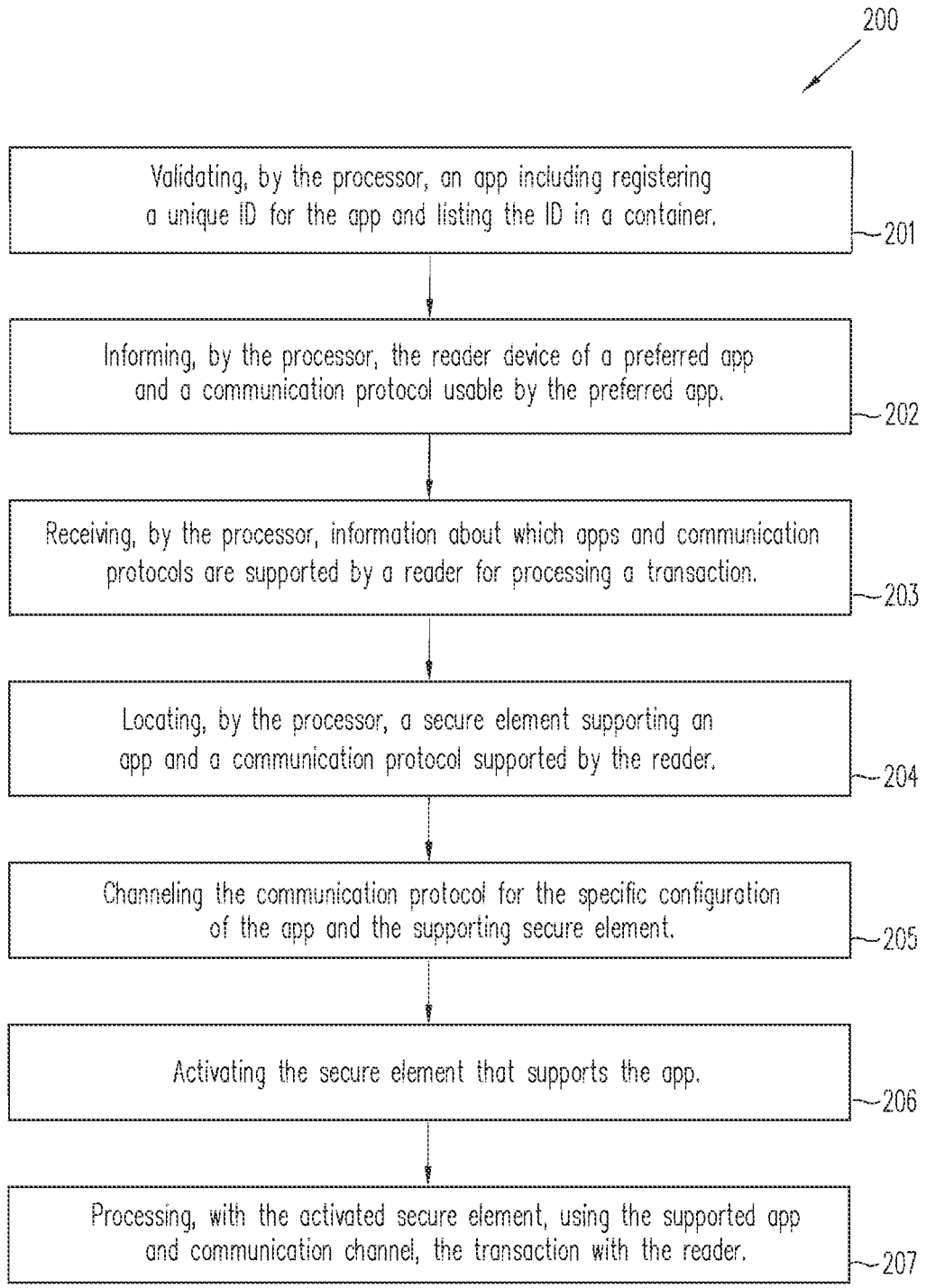
FIG. 2 is a flow chart illustrating a method for managing concurrent secure elements on a mobile device in accordance with an embodiment.

FIG. 2 illustrates a method 200 for managing concurrent secure elements on a mobile device, in accordance with an embodiment.

At step 201, method 200 may provide enrollment or registration for apps resident on mobile device 104. Method 200 may include validating, by the processor, an app including registering a unique ID for the app and listing the ID in a container. For example, when an application or applet is provisioned (e.g., downloaded and activated) on the mobile device 104, the app contains some unique ID. The secure elements broker 140 could employ an existing standard accepted identifier or rely on its own signature and ID mechanism to validate the legitimacy of an application or applet. (In the case of an applet, the ID is normally stronger as the process to provision the applet in the right SE is normally done from a controlled and secure environment following strict security processes.) Then, when the user or the service provider or apps provider decides to "register" the app ID with the secure elements broker 140, the ID is listed in a unique "container" (e.g., C1, C2, C3 shown in FIG. 1). Each container may be assigned different parameters based on, for example, usage or protocols. For example, the secure elements broker 140 could be used to manage specific usability cases—for example, C1 for transit, C2 for payment, C3 for social—specific protocols—for example, C1 for NFC, C2 for WiFi, C3 for Bluetooth, or specific providers—for example, C1 for PayPal, C2 for Google, C3 for Amazon. A cross-referencing of containers may be performed using a multi-layer matrix (e.g., matrix 300 shown in FIG. 3) within the secure elements broker 140.

A call between mobile device 104 and reader device 106 (by which a transaction may be conducted between mobile device 104 and reader device 106) may be application or user initiated or, alternatively, may be reader initiated. In each case, method 200 may perform similarly described actions at steps 202 through 207 that conform to the particular details of each case.

In the application or user initiated case (e.g., call initiated from user mobile device 104), a user may launch an application that partially relies on being "validated" or "approved" by a (secondary) applet residing on an SE (e.g., SE 121, 122, or 123 on mobile device 104). This allows controlling "fake" apps (e.g., an app not residing on an SE) to perform critical steps of an app process without linking to the secondary applet. Applications are frequently updated more often than applets, however, and the user may also decide to change the settings or parameters for apps at any point of time. It is also possible for a user to move some client application from one area of the mobile device 104 to another. For example, eBay apps on Android may be stored on the apps processor of the phone or in an mSD card. This constant variability may be accommodated by the secure elements broker 140. When an app is able to communicate with the secure elements broker 140 to access or call on its applet, even if the app is moved around or the applet is moved from one SE to another, the secure elements broker 140 may still be able to point to the right place. This also allows for easier communication channel management (e.g., matching the correct communication protocol with the launched app). For example, suppose an app using applet 1 in eSE is to trigger the NFC P2P LLCP protocol, but an app using applet 2 in UICC is to trigger a GSM communication, then the secure elements broker 140 can channel and "activate" the proper protocol for the specific configuration of the apps.

In the reader initiated case (e.g., call initiated from reader device 106), whatever the communication trigger is, the reader may talk "light" (e.g., provide information for establishing a connection or link) to the secure elements broker 140 via the proper channel (NFC CE for example) and deliver the proper request to the secure elements broker 140. For example, reader 106 may provide information to mobile device 104 that "I am a reader in NFC CE mode and I want to complete a PayPal transaction with security validation." A next step for the secure elements broker 140 may be to "check" against its known list of containers (e.g., C1, C2, C3 shown in FIG. 1) as to the location of the PayPal app that will be able to complete the process. Secure elements broker 140 may "know", for example, that in this specific request, the PayPal app is actually an applet residing in a trusted or secure zone environment (e.g., the Trust Zone environment of SE 123) and is known as Trustlet 2. At that point, the device will be activating the secure world or portion of Trust Zone, technically waking up the PayPal Trustlet to handle the request from the reader 106. The binding between the two devices—mobile device 104 and reader device 106—may now be optimized and may break as the required task is completed, technically shutting down the secure world of Trust Zone on the phone side (on mobile device 104) and the NFC P2P LLCP channel between the two devices.

One important consideration is that the reader 106 may be in control of the chosen app by the way of pre-loaded apps kernels (e.g., kernels 161-164). So the reader may interrogate the phone (e.g., mobile device 104), which activates an SE, and the SE communicates its supported app IDs, and the reader 106 then selects one. In a multi-SE environment, this may be sub-optimal. For example, SE 121 (e.g., a SIM) might contain app A, and SE 122 (e.g., a microSD) might contain app B. The reader 106 (or the customer, user of mobile device 104) may have a preference between these apps, but conventionally, the reader 106 will only be offered either app A or app B without regard to preference. A protocol made possible with a secure elements broker 140 is to have secure elements broker 140 in between the two devices which might enforce the customer's preferences. For example, if the customer prefers app B and if the reader supports apps A and B, the secure elements broker 140 could ensure that app B is chosen. Also the proper SE is always "powered up" to release the real (SE resident) app, knowing from the beginning where to look because of the pre-known list of containers. This allows bypassing the problem that may arise of multiple SEs that are powered up at the same time, creating prioritization and latency issues at the physical and logical level of a device.

In accordance with the descriptions given above and examples provided below with reference to FIG. 3, method 200, at step 202, may include informing, by the processor of mobile device 104, the reader device 106 of a preferred app and a communication protocol usable by the preferred app. At step 203, method 200 may include receiving, by the processor, information about which apps and communication protocols are supported by the reader for processing a transaction. At step 204, method 200 may include locating, by the secure elements broker 140 running on a processor of mobile device 104, a secure element supporting an app and a communication protocol supported by the reader. At step 205, method 200 may include channeling the communication protocol for the specific configuration of the app and the supporting secure element. At step 206, method 200 may include activating the secure element that supports the app. At step 207, method 200 may include processing, with the activated secure element, using the supported app and communication channel, the transaction with the reader.

FIG. 3 illustrates an example of a matrix 300 for managing concurrent secure elements on a mobile device in accordance with an embodiment. Matrix 300 illustrates one example of a matrix assignment reflecting a particular configuration, for example, of mobile device 104. Matrix 300 shown in FIG. 3 illustrates an example of how various parameters could be assigned to various secure elements (e.g., secure elements 121, 122, 123) to help the secure elements broker 140 choose the proper path to find the right apps. In this example, the communication protocol is limited to NFC. The example could be extended, however, to any mode of contact and contactless communication. Kernels describe what type of "payment process" is supported and, if additional services are supported by the selected apps, the preferences—such as loyalty-reward, couponing, or discount, for example.

To illustrate how to read matrix 300, in the case of the UICC as a secure element "hosting" four applications, it can be seen that: (1) Application 1 can communicate only via NFC P2P (NDEF) from within the ISIS wallet kernel and also supports couponing; (2) Application 2 is a PayPal (PP) app supporting Card Emulation (CE) and reward; (3) Application 3 is tag only (LLCP, reader/writer) linked to Visa and used for reward purposes (for example, a hospitality tag inviting the user to instantly sign up for a Visa card and get a reward); and (4) Application 4 is also tag (LLCP) but on the MasterCard network and does not have any additional services.

| EXAMPLES ILLUSTRATED BY FIG. 3 Example Call 1: "Normal" call: | |
|---|---|
| Mobile | apps (NDEF; PP) |
| Reader | reader (NDEF; kernel 4) |
| Mobile | SEB_settings (prefC3; Trustlet1; vSE; kernel 4; NDEF) |

The mobile device 104 communicates with another device (e.g. reader 106, phone, POS, tablet, etc.) and informs the reader device that its preferred payment app is PayPal in NFC P2P mode (NDEF).

The reader device replies: "yes, I support NDEF and PayPal kernel is kernel 4 in my system".

Mobile device 104 then completes the transaction via the secure elements broker 140 which knows that in this specific device 104, the preferred container for PayPal (or NDEF, depending on architecture decision) is C3 which contains a link to the PayPal Trustlet (Trustlet 1) inside virtual Secure Element (or Trust Zone) 123, which is able to communicate with the reader via Kernel 4 in NFC P2P mode (NDEF).

At that point, if the mobile device 104 has another Secure Element activated, it will know that it needs to do a power down or hibernate for this one and activate the vSE to complete that transaction.

Priorities assignment and latencies from a hardware point of view are not addressed here and should be viewed on a case by case basis depending on the device design as well as business agreements between various parties.

| Example Call 2: Reader device dominates mobile device preference: | |
|---|---|
| Mobile | apps (NDEF; PP) |
| Reader | reader (FailNDEF; CE; Kernel 1/2/3) |
| Mobile | SEB_settings (C1; App4; eSE; kernel 1; CE) |

The reader device 106 is in charge of the transaction and "picks" which apps it will support inside the phone (e.g., mobile device 104). In that case, the secure elements broker 140 is just a gateway or filter for the reader 106.

In the reader dominance case, the first step may be similar to the normal call case with the phone (e.g., mobile device 104) informing the reader 106 of its preferences. In this particular example, however, the reader 106 replies that it does not support NFC P2P but Card Emulation only, and only applications that can be read by Kernel 1, 2 or 3 (Visa, MC, Amex).

The mobile device 104 secure elements broker 140 then goes down its list of preferences and determines that the first best alternative to its preferred method with that specific reader will be to launch application 4 from container C1 (assigned to Card Emulation mode in that case) contained in the embedded Secure Element 122 which can read Kernel 1 (Visa) in CE mode.

| Example Call 3: Mobile device dominates reader device decision: | |
|---|---|
| Mobile | apps (NDEF; PP) |
| Reader | reader (prefCE/NDEF/LLCP; prefKernel 1/2/4/5;) |
| Mobile | SEB_settings (C2; App2; eSE; kernel 4; CE) |

In the mobile device dominance case, the first step may be similar to the normal and reader dominance calls with the phone (e.g., mobile device 104) informing the reader 106 of its preferences.

The reader 106 may reply, in this example, that its supported modes of communication are all NFC modes and its supported kernels are Visa, MC, PayPal, and Google. At that point, the reader 106 is giving full control to the mobile device 104 to pick whichever application it wants to use.

The mobile device 104 replies that the path to the application to be used is contained in container C2, identified as application 2 residing in the eSE and able to "talk" with Kernel 4 (PP) via Card Emulation mode.

It may be noted that preferences may be set up by the secure elements broker provider, by the users, or by the service provider for the application provided (which may be a merchant, for example). With multiple secure elements and multiple preferences prioritization, the secure elements broker 140 may be able to make an instant decision on the most appropriate path depending on the highest control entity preferences (e.g., device owner vs. user vs. provider vs. other).

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable and executable medium, which may refer to any medium that participates in providing instructions to the processor for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A device, comprising:
   a non-transitory memory storing instructions; and
   a processor configured to execute the instructions to cause the device to:
   determine a first application of a plurality of applications to be executed on the device, wherein each of the plurality of applications is associated with at least one respective virtual secure element of a plurality of virtual secure elements;
   determine a first virtual secure element, of the plurality of virtual secure elements, to use with the first application; and
   in response to determining the first virtual secure element, select the first virtual secure element for activation with the first application.

2. The device of claim 1, wherein the determining the first application comprises:
   detecting an initiation of a transaction that utilizes the first application at the device; and
   responsive to the detecting of the initiation of the transaction, determining the first application.

3. The device of claim 2, wherein the executing the instructions further causes the device to process, using the virtual secure element and via the first application, the transaction.

4. The device of claim 2, wherein the transaction is initiated via a near field communication (NFC) connection established between a point-of-sale system and the device.

5. The device of claim 1, wherein the determining the first application comprises:
   determining a user selection of the first application of the plurality of applications operable to be executed on the device, wherein at least two of the plurality of applications are each associated with a different functionality provided by a different one of the plurality of virtual secure elements.

6. The device of claim 1, wherein the device further comprises a physical secure element that enables a secure area for using the plurality of virtual secure elements.

7. The device of claim 1, wherein the device further comprises a secure elements broker that logically maps each of the plurality of virtual secure elements to at least one respective application of the plurality of applications.

8. The device of claim 1, wherein the device further comprises a physical secure element that hosts the plurality of applications, each of the plurality of applications associated with a respective one of the plurality of virtual secure elements.

9. The device of claim 1, wherein the determining the first application comprises determining a transaction, between the device and a second device, that is initiated via a near field communication (NFC) connection established between the device and the second device.

10. The device of claim 1, wherein the executing the instructions further causes the device to,
   prior to activating the first virtual secure element, determine that a second secure element of the plurality of virtual secure elements is activated; and
   deactivate the second secure element.

11. A method comprising:
   determining to execute a first application of a plurality of applications on a device, wherein each of the plurality of applications is associated with at least one respective virtual secure element of a plurality of virtual secure elements that are implemented on the device;
   selecting a first virtual secure element, of the plurality of virtual secure elements, to activate for execution of the first application; and
   in response to selecting the first virtual secure element, activating the first virtual secure element for execution of the first application.

12. The method of claim 11, wherein the determining to execute the first application is based on a detection of an initiation of a transaction that utilizes the first application at the device.

13. The method of claim 11, wherein the determining to execute the first application is based on receiving a user selection of the first application of the plurality of applications operable to be executed on the device, wherein at least two of the plurality of applications are each associated with a different functionality provided by a different one of the plurality of virtual secure elements.

14. The method of claim 11, wherein the device further comprises a physical secure element that enables a secure area for using the plurality of virtual secure elements.

15. The method of claim 11, wherein the device further comprises a secure elements broker that logically maps each of the plurality of virtual secure elements to at least one respective application of the plurality of applications.

16. The method of claim 11, wherein the device further comprises a physical secure element that hosts the plurality of applications, each of the plurality of applications associated with a respective one of the plurality of virtual secure elements.

17. A non-transitory machine-readable medium having instructions stored thereon, the instructions executable to cause of a device to perform operations comprising:
   determining to execute a first application of a plurality of applications on the device, wherein each of the plurality of applications is associated with at least one respective virtual secure element of a plurality of virtual secure elements that are implemented on the device;
   selecting a first virtual secure element, of the plurality of virtual secure elements, to activate for execution of the first application; and
   in response to selecting the first virtual secure element, activating the first virtual secure element for execution of the first application.

18. The non-transitory machine-readable medium of claim 17, wherein the determining to execute the first application is based on a detection of an initiation of a transaction that utilizes the first application at the device.

19. The non-transitory machine-readable medium of claim 17, wherein the determining to execute the first application is responsive to detecting a user selection of the first application of the plurality of applications, wherein each of the plurality of applications is mapped to a different one of the plurality of virtual secure elements.

20. The non-transitory machine-readable medium of claim 17, wherein the device further comprises a physical secure element that hosts the plurality of applications, each of the plurality of applications associated with a respective one of the plurality of virtual secure elements.

* * * * *

UNITED STATES PATENT AND TRADEMARK OFFICE
CERTIFICATE OF CORRECTION

| | | |
|---|---|---|
| PATENT NO. | : 12,022,290 B2 | Page 1 of 1 |
| APPLICATION NO. | : 18/174457 | |
| DATED | : June 25, 2024 | |
| INVENTOR(S) | : Sebastien Taveau and John Hastings Granbery | |

It is certified that error appears in the above-identified patent and that said Letters Patent is hereby corrected as shown below:

In the Claims

Claim 17, Column 12, Lines 7-8, change "the instructions executable to cause of a device to perform operations comprising:" to --the instructions executable to cause a device to perform operations comprising:--.

Signed and Sealed this
Seventh Day of January, 2025

Derrick Brent
*Acting Director of the United States Patent and Trademark Office*